United States Patent [19]

Payrhammer et al.

[11] Patent Number: 4,853,742
[45] Date of Patent: Aug. 1, 1989

[54] PHOTOGRAPHIC PROCESSING APPARATUS USABLE WITH MOBILE CASSETTES

[75] Inventors: Bernd Payrhammer, Munich; Leonhard Huber, Glonn, both of Fed. Rep. of Germany

[73] Assignee: Afga-Gevaert Aktiengesellschaft, Leverkusen, Fed. Rep. of Germany

[21] Appl. No.: 175,160

[22] Filed: Mar. 30, 1988

[30] Foreign Application Priority Data

Apr. 17, 1987 [DE] Fed. Rep. of Germany ....... 3713170

[51] Int. Cl.⁴ ...................... G03B 27/32; G03B 27/52
[52] U.S. Cl. ..................................... 355/27; 354/275; 355/64; 355/72
[58] Field of Search .................. 355/27, 50, 51, 64, 355/72; 354/275

[56] References Cited

U.S. PATENT DOCUMENTS

| | | | |
|---|---|---|---|
| 4,147,427 | 4/1979 | Stewart | 355/72 |
| 4,153,361 | 5/1979 | Axelrod | 354/275 |
| 4,166,588 | 9/1979 | Krehbiel et al. | 355/72 X |
| 4,218,135 | 8/1980 | Tsuda et al. | 355/72 |
| 4,259,007 | 3/1981 | Arai et al. | 355/27 |
| 4,299,458 | 11/1981 | Burton | 355/64 X |
| 4,566,785 | 1/1986 | Takenouchi | 355/72 |
| 4,621,272 | 11/1986 | Toriumi et al. | 355/72 X |
| 4,652,117 | 3/1987 | Kogane et al. | 355/72 |

FOREIGN PATENT DOCUMENTS 3150495 6/1983 Fed. Rep. of Germany .
3151932 7/1983 Fed. Rep. of Germany .

Primary Examiner—Richard A. Wintercorn
Attorney, Agent, or Firm—Peter K. Kontler

[57] ABSTRACT

A photographic printer or developing machine has a station for processing photographic material. A station for accommodating a mobile, carriage-like cassette in an operative position is disposed adjacent to the processing station on either side thereof. One of the operative stations receives a take-off cassette carrying a reel of photographic material to be processed while the other operative station receives a take-up cassette. An additional station for holding a replacement cassette in a ready position is located next to each of the operative stations. A propelling mechansm for pushing a cassette out of its operative position is provided at each operative station as is a drawing mechanism for pulling a replacement cassette from the ready position to the operative position. In operation, photographic material from a full take-off cassette in one of the operative stations is automatically paid out of the cassette, conveyed through the processing station and coiled into an empty take-up cassette in the other operative station.

20 Claims, 3 Drawing Sheets

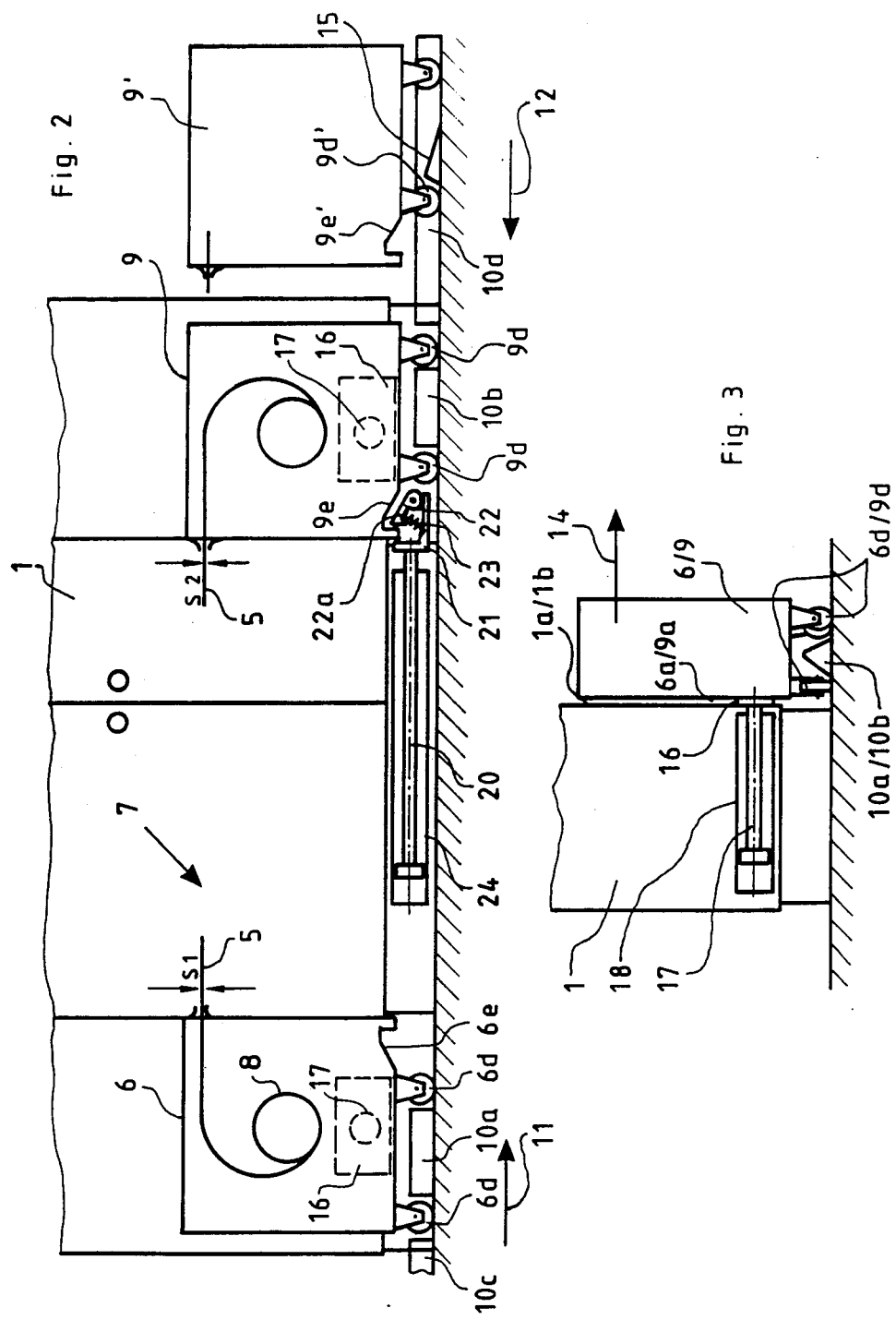

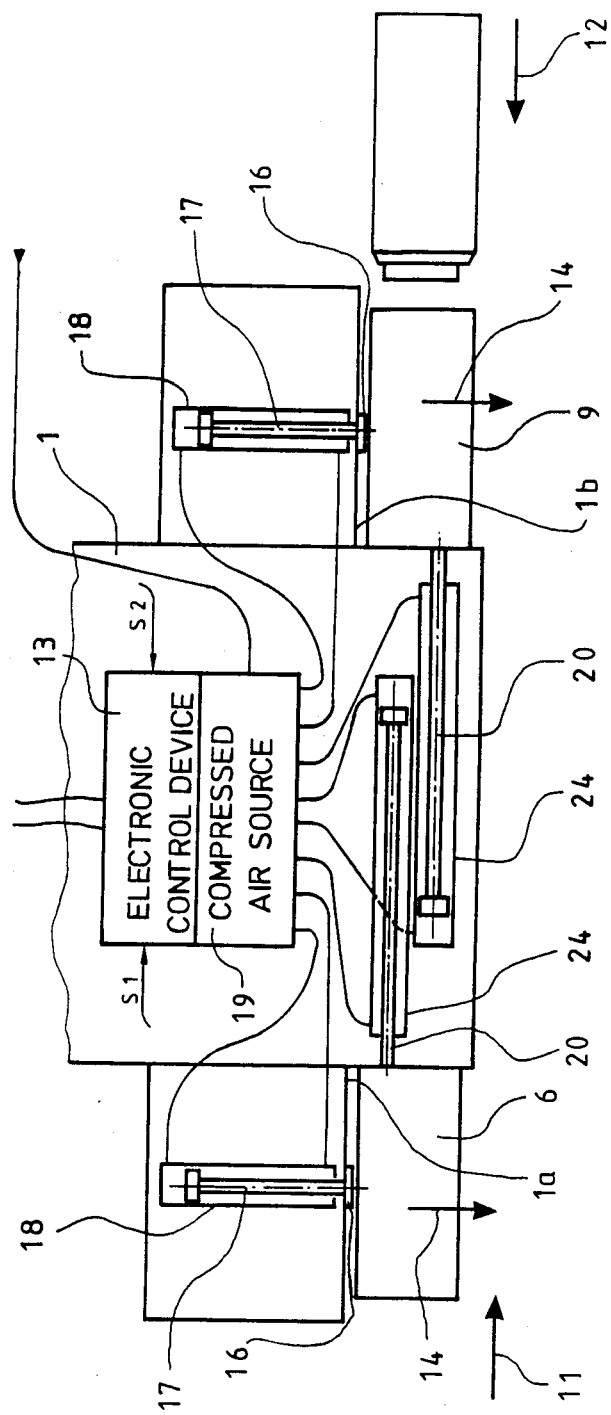

PHOTOGRAPHIC PROCESSING APPARATUS USABLE WITH MOBILE CASSETTES

CROSS REFERENCE TO RELATED APPLICATION

The invention which is disclosed in the present application is related to the invention which is disclosed in the commonly owned copending application Ser. No. 175,161, filed Mar. 30, 1988.

BACKGROUND OF THE INVENTION

The invention relates generally to the processing of photosensitive material.

More particularly, the invention relates to an apparatus, e.g., a printer or developing machine, for processing photosensitive material such as photographic paper.

It is known to transport reels of photographic material in wheeled cassettes and photographic processing apparatus have been designed to operate with such cassettes. A conventional apparatus of this type includes a processing station and cassette guiding means on either side of this station. One side of the processing station constitutes an inlet for photographic material to be processed and the associated cassette guiding means serves to properly locate a supply cassette, i.e., a cassette with a reel of photographic material to be processed, in an operative position adjacent to the inlet. The other side of the processing station constitutes an outlet for material which has undergone processing and corresponding cassette guiding means functions to properly locate a take-up cassette, that is, a cassette with an empty reel, in an operative position adjacent to the outlet. The apparatus further includes means for automatically conveying photographic material from the supply cassette into the processing station and automatically threading the material into the take-up cassette.

A copying apparatus of the type described above is know, for example, from the West German Offenlegungsschrift 31 51 932. The copying apparatus is designed so that a roll of photographic material from a take-off or supply cassette placed adjacent to the apparatus can be automatically threaded into the latter. A mobile cassette which can be used in conjunction with such a conventional copying apparatus is known from the west German Offenlegungsschrift 31 50 495. Moreover, the use of such mobile cassettes together with copying apparatus having automatic paper infeed and outfeed devices is known from commercially available apparatus of this type.

When the supply cassette becomes empty and the take-up cassette becomes full in a conventional processing apparatus, operating personnel must remove the cassettes and replace the latter with a fresh supply cassette and a fresh take-up cassette, respectively. This requires monitoring of the degree of filling of the cassettes, either visually or by means of appropriate indicators on the apparatus, and the presence of operating personnel.

A copying apparatus equipped with a pair of vertically oriented rotary discs has also been proposed. One of the discs carries several supply cassettes while the other carries a number of take-up cassettes. When a supply cassette becomes empty or a take-up cassette becomes full, the next cassette is automatically rotated into the respective operative position. This apparatus has the drawback that deposition of the large cassettes on the rotary disc is relatively difficult. Furthermore, the drives for the rotary discs must be capable of moving the large masses of the several cassettes carried by the discs. This makes the overall arrangement large as well as heavy.

OBJECTS AND SUMMARY OF THE INVENTION

It is an object of the invention to provide a processing apparatus for photosensitive material which does not require movement of the combined masses of several cassettes.

Another object of the invention to provide a processing apparatus for photosensitive material which does not require difficult manipulation of cassettes.

An additional object of the invention to provide a relatively simple method of operating a processing apparatus for photosensitive material which is designed for use with mobile cassettes.

A further object of the invention to provide a processing apparatus for photosensitive material which can be used with mobile cassettes adapted to carry reels of photosensitive material and is designed in such a manner that cassette exchange can be performed automatically without the presence of operating personnel.

The preceding objects, as well as others which will become apparent as the description proceeds, are achieved by the invention.

One aspect of the invention resides in an apparatus for processing photosensitive material, e.g., a photographic apparatus for processing photographic paper. The apparatus comprises a processing station for photosensitive material and this processing station may, for example, include a printer or a developing machine. The apparatus further comprises a first station to one side of the processing station, and the first station is designed to accommodate a mobile or carriage-like cassette for photosensitive material and includes cassette guiding and locating means. The apparatus also comprises means for conveying photosensitive material between the processing station and the first station. A second station is disposed next to the first station and is designed to accommodate a mobile or carriage-like cassette for photosensitive material preparatory to entry into the first station. The second station is provided with cassette guiding and holding means. The apparatus additionally comprises means for moving a cassette from the second station to the first station along a first direction and means for removing a cassette from the first station along a second direction transverse to the first direction. By way of example, the moving means may be designed to pull or draw a cassette into the first station while the removing means may be designed to push or propel a cassette out of such station.

The guiding and locating means of the first station may include a guide which extends along a predetermined direction and the guiding and holding means of the second station is then preferably located next to such guide as considered in the predetermined direction. The latter direction may coincide with the first direction, that is, the direction of movement of a cassette from the second station to the first station.

Another station may be disposed to another side of the processing station, e.g., the side of the processing station opposite that with the first station. This other station is again designed to accommodate a mobile or carriage-like cassette for photosensitive material and again includes cassette guiding and locating means. An additional station is located next to the other station and is designed to accommodate a mobile or carriage-like cassette preparatory to entry into the other station. As is the case for the second station, the additional station includes cassette guiding and holding means. Additional means is provided for moving a cassette from the additional station to the other station along a preselected direction as is additional means for removing a cassette from the other station along another direction transverse to the preselected direction.

The first station may accommodate a take-off or supply cassette while the other station accommodates a take-up cassette and, to this end, the conveying means may be designed to withdraw photosensitive material from a cassette at the first station, convey the material through the processing station and feed the material into a cassette at the other station. Preferably, the conveying means operates automatically.

The guiding and locating means of the other station may include a guide which extends along a predetermined direction and the guiding and holding means of the additional station is then advantageously located next to this guide as considered in the predetermined direction. Such direction may coincide with the preselected direction along which a cassette travels from the additional station to the other station.

The apparatus of the invention is advantageously designed to operate with cassettes of the type which transport photosensitive material on reels, that is, in the form of coils or rolls.

The cassette guiding and locating means of the first and other stations disposed to different sides of the processing station function to locate the cassettes in predetermined operative positions. On the other hand, the cassette guiding and holding means of the second and additional stations which are disposed next to the first and other stations, respectively, serve to locate the cassettes in predetermined ready positions.

The processing apparatus in accordance with the invention is provided with a removing means for each of the two stations which accommodates a cassette in an operative position. These removing means, which may be constituted by pushing or propelling devices, function to propel an emptied or filled cassette, as the case may be, out of the respective station. The apparatus further comprises means for locating replacement cassettes in ready positions, and a moving means for bringing a replacement cassette from the ready position to the operative position is associated with each of the propelling devices. The moving means, which may be constituted by pulling or drawing devices, operate transverse, e.g., at right angles, to the propelling devices. By virtue of these features, it becomes possible for a cassette in operative position to be automatically replaced by an associated fresh cassette so that no operating personnel need be present when replacement of a cassette becomes necessary.

The novel features which are considered as characteristic of the invention are set forth in particular in the appended claims. The improved processing apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged, partially broken away fragment of the view of FIG. 1 showing additional details of the apparatus;

FIG. 3 is a fragmentary, partially broken away side view of the apparatus of FIG. 1; and FIG. 4 is a fragmentary, broken away plan view of the apparatus of FIG. 1.

DESCRIPTION OF THE PREFERRED EMBODIMENTS

Figure 1:
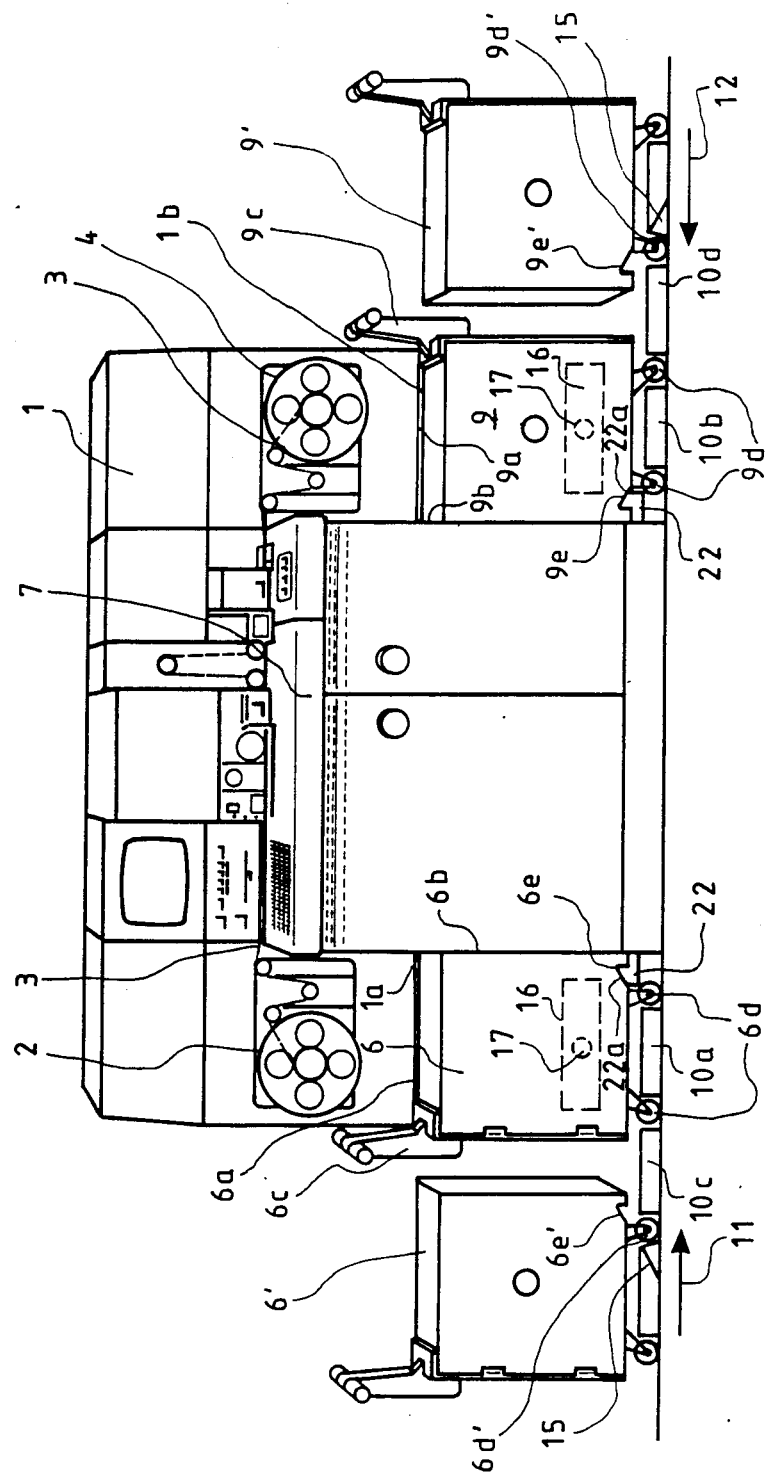
FIG. 1 is a schematic front view of an apparatus according to the invention for processing photosensitive material.

The drawings illustrate an apparatus in accordance with the invention for processing photosensitive material. The apparatus, which is generally identified by the reference numeral 1, is here assumed to be a photographic apparatus. Specifically, the apparatus 1 is shown as being in the form of a photographic printer. However, this is by way of example only and is not intended to limit the nature of the apparatus 1. For instance, the apparatus 1 could just as well be constituted by a photographic developing machine.

Referring to FIGS. 1 and 2, the apparatus 1 which, as mentioned, is in the form of a printer, includes a printing or exposure station 7 constituting a processing station (the printing station 7 would be replaced by a developing station if the apparatus 1 were a developing machine). A large spool or reel 2 is rotatably mounted in the printer 1 and carries a series of developed filmstrips 3 which have been spliced to one another and coiled onto the spool 2. The filmstrips 3 are transported through the printing station 7 and, after the production of copies, are wound onto a take-up spool or reel 4.

Exposure and, if desired, enlargement, of the filmstrips 3 are performed on photosensitive material constituted by photographic paper or copy material 5. The photographic paper 5 is supplied in the form of a large roll 8 which is coiled onto a spool or reel carried by a mobile, carriage-like take-off or supply cassette 6. The take-off cassette 6 is located in an operative position at a station adjacent to one side of the printing station 7. A take-up cassette 9 is disposed in an operative position at another station adjacent to the opposite side of the printing station 7. The take-up cassette 9 is initially empty.

The take-off cassette 6 has a lateral face 6a (see also FIG. 3) and a front face 6b and the station for the take-off cassette 6 includes a niche 1a which is defined by the printer 1 and constitutes part of a guiding and locating means for the take-off cassette 6. The niche 1a is adjusted to the faces 6a,6b and functions to locate the take-off cassette 6 in its operative position.

In a similar vein, the take-up cassette 9 is provided with a lateral face 9a (see also FIG. 3) and a front face 9b and the station for the take-up cassette 9 includes a niche 1b which is defined by the printer 1 and constitutes part of a guiding and locating means for the take-up cassette 9. The niche 1b is adjusted to the faces 9a, 9b and serves to locate the take-up cassette 9 in its operative position.

When the take-off cassette 6 is brought to its operative position and connected to the printer 1 in a manner known per se, the photographic paper 5 is paid out of the take-off cassette 6 and, in conventional fashion, adhesively secured to a conveyor or preceding paper band for transport through the printer 1. Transport of the photographic paper 5 through the printer 1 may also be accomplished using other suitable means. In any event, the printer 1 comprises conveying means designed to automatically initiate uncoiling of the photographic paper 5 from the take-off cassette 6 and to automatically advance the paper 5 to and through the printing station 7. During passage through the printing station 7, the photographic paper 5 is exposed. After exposure, the conveying means automatically advances the paper 5 to the station containing the initially empty take-up cassette 9 and automatically feeds the paper 5 into such cassette. The take-up cassette 9 is provided with a spool or reel and the exposed photographic paper 5 is coiled onto this reel.

In the prior art, operating personnel must remove the take-off cassette 6 when it becomes empty and push a fresh, loaded cassette into the operative position previously occupied by the take-off cassette 6. Similarly, the take-up cassette 9 must be removed by operating personnel when filled and replaced with a fresh, empty cassette. Removal of the cassettes 6, 9 is accomplished using special handles 6c,9c provided on the cassettes 6 and 9, respectively.

The cassettes 6,9 are mounted on respective wheels 6d,9d in order to facilitate movement of the cassettes 6,9 which thus resemble carriages. Each of the wheels 6d,9d has a horizontal axis of rotation and is additionally pivotable on an axis normal to such axis of rotation, that is, on a vertical axis, so that the cassettes 6,9 can be easily moved in all directions. In the illustrated embodiment, the take-off cassette 6 has a pair of laterally spaced front wheels 6d and a pair of laterally spaced rear wheels 6d, and likewise for the take-up cassette 9.

A guide in the form of a rail 10a is disposed on the ground in the niche 1a to assist in locating the take-off cassette 6 in its operative position. The take-off cassette 6 is moved into the operative position in the direction indicated by the arrow 11 and the rail 10a, which constitutes part of the guiding and locating means for the cassette 6, extends along the direction 11 and is symmetrically arranged relative to the longitudinal center line of the photographic paper 5. The two front wheels 6d of the take-off cassette 6 are spaced transversely of the direction 11 and straddle the rail 10a, that is, the two front wheels 6d are located on opposite sides of the rail 10a. The same holds true for the two rear wheels 6d of the take-off cassette 6.

In like manner, a guide in the form of a rail 10b is disposed on the ground in the niche 1b to assist in locating the take-up cassette 9 in its operative position. The take-up cassette 9 is moved into the operative position in the direction indicated by the arrow 12 and the rail 10b, which constitutes part of the guiding and locating means for the cassette 9, extends along the direction 12 and is symmetrically arranged with respect to the longitudinal center line of the photographic paper 5. The two front wheels 9d of the take-up cassette 9 are spaced transversely of the direction 12 and straddle the rail 10b, i.e., the two front wheels 9d are located on opposite sides of the rail 10b. The same applies for the two rear wheels 9d of the take-up cassette 9.

The rails 10a,10b may have a sword-like configuration or, as shown in FIG. 3, may be wedge-shaped or triangular. The rails 10a,10b are positioned with an edge or vertex thereof directed upwards and function to align the cassettes 6,9 transversely of the direction in which the photographic paper 5 is fed into the printer 1.

In order to ascertain when replacement of the cassettes 6,9 is necessary, the printer 1 is provided with a detector S1 at the upstream end of the printing station 7 and a detector S2 at the downstream end of the station 7. The detectors S1 and S2 sense whether or not the photographic material 5 is present. If one of the detectors S1 and S2 indicates that the photographic material 5 is no longer present below it or between its sensors (which may, for instance, be in the form of reflex light barriers), the cassette 6 or 9 nearest such detector must be replaced. When a detector S1 or S2 senses an absence of the photographic material 5, this detector sends a signal to an electronic control means or control device 13 shown in FIG. 4.

In the prior art, such signal is, for example, converted into an alarm which alerts the operating personnel who thereupon replace the appropriate cassette. By contrast, the invention intends for cassette replacement to be performed automatically without operating personnel.

To this end, a station for holding a loaded replacement take-off or supply cassette 6' in a ready position is located next to the station which accommodates the operative take-off cassette 6. These two stations are disposed side-by-side as considered along the direction 11 in which the take-off cassette 6 is moved into its operative position. The station for the replacement take-off cassette 6' includes a rail 10c which may resemble, and constitutes an extension of, the rail 10a. The rail 10c extends so far towards the station which accommodates the operative take-off cassette 6 that the replacement take-off cassette 6' can be moved into a ready position close to the operative take-off cassette 6. The replacement take-off cassette 6' resembles the operative take-off cassette 6 and corresponding elements of these cassettes are identified by the same reference numerals but with primes added for the replacement cassette 6'.

The station for the replacement take-off cassette 6' is designed such that the cassette 6' can be positioned at a well-defined location. Thus, this station is provided with a holding or retaining means which, by way of example, is illustrated as being in the form of a wedge-like stop 15. The stop 15, which is disposed in the path of at least one wheel 6d' of the replacement take-off cassette 6', has an inclined upper surface which rises gradually in the direction indicated by the arrow 11. This surface terminates at an end face of the stop 15 which confronts the printer 1 and has a steep downward inclination in the direction indicated by the arrow 11.

The replacement take-off cassette 6' is brought in the ready position by operating personnel. Once a front wheel 6d' of the replacement take-off cassette 6' has been pushed over the stop 15, the cassette 6' is adjusted along the direction 11 and the maximum distance of the replacement take-off cassette 6' from the printing station 7 and the operative take-off cassette 6 is fixed since the replacement take-off cassette 6' cannot roll backwards over the stop 15. The stop 15 accordingly serves to hold the replacement take-off cassette 6' in the ready position.

The two front wheels 6d', as well as the two rear wheels 6d', of the replacement take-off cassette 6' straddle the rail 10c in the same manner that the wheels 6d of the operative take-off cassette 6 straddle the rail 10a. The rail 10c thus functions to guide and position the replacement take-off cassette 6' transversely of the direction 11. The stop 15 and the rail 10c together constitute a guiding and holding means for the replacement take-off cassette 6'.

The niche 1a of the printer 1 positions the operative take-off cassette 6 so that the front wheels 6d are at a first predetermined location as considered along the direction 11 and the rear wheels 6d are at a second predetermined location as considered along this direction. The rail 10a terminates short of the printing station 7 thereby creating a gap at the location of the front wheels 6d while the rails 10a,10c are spaced from one another to define a gap at the location of the real wheels 6d. These gaps make it possible to shift the operative take-off cassette 6 out of the niche 1a in a direction 14 (see FIGS. 3 and 4) normal to the direction 11 once the cassette 6 is empty. Shifting of the operative take-off cassette 6 out of the niche 1a makes room in the latter for the replacement take-off cassette 6' located in the ready position.

The replacement take-off cassette 6' may be placed in the ready position immediately after the first take-off cassette 6 has been brought into the operative position or at any time during transport of the photographic paper 5 between the operative take-off cassette 6 and the operative take-up cassette 9. Hence, no operating personnel need be specially present or available at the time of cassette replacement.

A station for holding an empty replacement take-up cassette 9' in a ready position is located next to the station which accommodates the operative take-up cassette 9. These two stations are disposed side-by-side as considered along the direction 12 in which the take-up cassette 9 is moved into its operative position.

The stations for the replacement take-up cassette 9' and the operative take-up cassette 9 need not be described in detail since they are identical to the respective stations for the replacement take-off cassette 6' and the operative take-off cassette 6. However, it is to be observed that the rail constituting part of the guiding and holding means for the replacement take-up cassette 9' and corresponding to the rail 10c is identified by the reference numeral 10d.

As before, the replacement take-up cassette 9' resembles the operative take-up cassette 9 and corresponding elements of these cassettes are identified by the same reference numerals but with primes added for the replacement cassette 9'.

A means for removing the operative take-off cassette 6 from the niche 1a is mounted in back of that wall of the niche 1a which confronts the lateral face 6a of the operative take-off cassette 6. The removing means is here in the form of a pushing or propelling mechanism which is automatically activated by the electronic control device 13 when the latter receives a signal from the detector S1 indicating the absence of the photographic paper 5. Upon activation, the propelling mechanism pushes the operative take-off cassette 6 out of the niche 1a in the direction indicated by the arrows 14 and thereby automatically makes room for the replacement take-off cassette 6' located in the ready position. The direction 14 in which the propelling mechanism acts is normal to the direction 11 in which the operative take-off cassette 6 is moved into the niche 1a.

As best seen in FIGS. 3 and 4, the propelling mechanism includes a piston rod 17 which is mounted in an airtight cylinder 18 for sliding movement back-and-forth along the direction 14. The piston rod 17 has a free end which projects from the cylinder 18 and is located proximate to the lateral face 6a of the operative take-off cassette 6. The free end of the piston rod 17 carries a plate 16 which is parallel to the lateral face 6a. The plate 16 is arranged to abut the lateral face 6a when the piston rod 17 is extended to thereby push the operative take-off cassette 6 out of the niche 1a. Once the operative take-off cassette 6 has been pushed out of the niche 1a, the piston rod 17 is automatically retracted to the inoperative or starting position shown in FIGS. 3 and 4.

A second propelling mechanism 16–18 is provided to remove the operative take-up cassette 9 from the niche 1b in the direction 14. The propelling mechanism 16–18 for the operative take-up cassette 9 is identical to that for the operative take-off cassette 6 and hence need not be described in detail. However, in contrast to the propelling mechanism 16–18 for the operative take-off cassette 6, the propelling mechanism 16–18 for the operative take-up cassette 9 is automatically activated by the electronic control device 13 when the detector S2 generates a signal indicative of the absence of the photographic paper 5. It will be observed that the propelling mechanism 16–18 for the operative take-up cassette 9 acts in a direction normal to the direction 12 in which the cassette 9 enters the niche 1b.

The propelling mechanisms 16–18 may be operated pneumatically. To this end, the printer 1 may be provided with a source 19 of compressed air as shown in FIG. 4. In the illustrated embodiment, the compressed air source 19 is common to both of the propelling mechanisms 16–18. The compressed air source 19 is regulated by the electronic control device 13 which causes the compressed air source 19 to activate the appropriate propelling mechanism 16–18 in response to a signal from one of the detectors S1 and S2. The compressed air source 19 then extends and retracts the piston rod 17 of the respective propelling mechanism 16–18.

Once the full take-up cassette 9 has been removed from the operative position in the niche 1b, the waiting replacement take-up cassette 9' must be automatically moved into such position. This is accomplished via a moving means which functions to shift the replacement take-up cassette 9' from the ready position to the operative position in the direction 12. The moving means is here in the form of a pulling or drawing mechanism which is again automatically activated by the electronic control device 13.

With reference to FIG. 2, the drawing mechanism may, for instance, include a piston rod 20 which is mounted in an airtight cylinder 24 for sliding movement back-and-forth along the direction 12. The cylinder 24 is located behind that side of the printer 1 which confronts the front face of the replacement take-up cassette 9' and is arranged so that the piston rod 20 is disposed laterally of the wheels 9d' and at a level below the lower end of the front face. The piston rod 20 has a free end which projects out of the cylinder 24. The free end of the piston rod 20 carries a support 21, and a detent or catch 22 is pivotally mounted on the support 21. A spring 23 acts against the detent 22 and reacts against the support 21 to thereby resiliently bias the detent 22 upwards into an operative position. when the detent 22 is in its operative position, the upper surface 22a of the detent 22 is upwardly inclined as considered in the direction 12. The upper surface 22a terminates in an end face of the detent 22 which is directed towards the cylinder 24 and drops sharply as considered in the direction 12. The upper surface 22a is arranged to slide along the lower surface of the front face of the replacement take-up cassette 9' when the piston rod 20 is extended. This will cause the detent 22 to pivot couterclockwise out of the operative position against the action of the spring 23.

A groove or recess 9e' is formed in the bottom of the replacement take-up cassette 9' adjacent to the front face of the latter (the operative take-up cassette 9 has a similar groove 9e). The groove 9e' extends transversely of the direction 12 across the entire width of the replacement take-up cassette 9'. The groove 9e' is designed to receive the detent 22 and defines a downwardly extending detent or catch complementary to the detent 22 at the front of the replacement take-up cassette 9'.

Since the grooves 9e,9e' extend entirely across the widths of the take-up cassettes 9,9', the latter can be moved out of the operative position of the niche 1b in the direction 14 without first disengaging the detent 22 from the grooves 9e,9e'. Thus, the take-up cassettes 9,9' can travel over the detent 22.

The drawing mechanism 20-24 may again be operated pneumatically and, to this end, may be connected with the compressed air source 19 as illustrated in FIG. 4.

Once the operative take-up cassette 9 has been pushed out of the operative position in the direction 14 via the associated propelling mechanism 16-18, the electronic control device 13 receives a signal indicative of removal of the operative take-up cassette 9. The control device 13 thereupon disconnects the compressed air source 19 from this propelling mechanism 16-18 and connects the source 19 to the drawing mechanism 20-24. In response, the piston rod 20 moves counter to the direction 12 from the inoperative or starting position shown in FIGS. 2 and 4. As the piston rod 20 extends, the upper surface 22a of the detent 22 comes into engagement with the bottom of the complementary detent at the front of the replacement take-up cassette 9'. This causes the detent 22 to pivot counterclockwise, i.e., downwards, out of its operative position against the action of the spring 23. When the piston rod 20 has extended to the point where the detent 22 clears the complementary detent on the replacement take-up cassette 9', the spring 23 urges the detent 22 clockwise or upwards so that the latter snaps into the groove 9e'. a signal is now transmitted to the electronic control device 13 which switches the flow of compressed air in the source 19 so that the piston rod 20 retracts. Inasmuch as the detent 22 mates with the complementary detent on the replacement take-up cassette 9', the piston 20 is coupled to the cassette 9' and draws the latter behind it in the direction 12 towards the operative position. The replacement take-up cassette 9' assumes the operative position previously occupied by the displaced take-up cassette 9 upon return of the piston 20 to its starting position.

When the replacement take-up cassette 9' arrives at the operative position, the photographic paper 5 is automatically threaded into the cassette 9' as outlined earlier. In order to prepare for the automatic replacement of the take-up cassette 9', a further replacement take-up cassette must now be brought into the ready position originally occupied by the take-up cassette 9'. This may be done at any time between arrival of the take-up cassette 9' at the operative position and filling of the cassette 9' with the photographic paper 5.

A second drawing mechanism 20-24 is provided to pull the replacement take-off cassette 6' into the niche 1a in the direction 11 once the operative take-off cassette 6 has been removed from the operative position in the direction 14. The drawing mechanism 20-24 for the replacement take-off cassette 6' is identical to that for the replacement take-up cassette 9' and therefore need not be described in detail. It is observed, however, that the grooves or recesses which are formed in the undersides of the take-off cassettes 6,6' and correspond to the grooves 9e,9e' of the take-up cassettes 9,9' are identified by the reference characters 6e,6e', respectively.

For the sake of simplicity, other embodiments of the invention have not been illustrated in the drawings. For instance, the printer 1 could be replaced by a developing machine for photographic material in the form of rolls or coils. Thus, if the cassettes 6,6' were to carry reels of exposed photographic material, it would be necessary to connect such cassettes to a developing machine. Furthermore, instead of driving the propelling mechanisms 16-18 and the drawing mechanisms 20-24 pneumatically, it is possible to drive these mechanisms by means of one or more electric motors and corresponding mechanical transmissions. The stops 15 may likewise have any other form suitable for positioning the cassettes 6',9' and it is also possible to mount the stops 15 so that they can be depressed into the ground against the action of resilient elements, e.g., spring. In such an event, the stops 15 are temporarily sunk into the ground when a wheel 6d',9d' of the cassettes 6',9' rides over the same. Moreover, each of the centrally located rails 10a-10d can be replaced by two rails for the two lateral pairs of wheels of a cassette.

It is additionally possible to arrange the rails 10a-10d and the drawing mechanisms 20-24 so that these extend along the direction 14 while the propelling mechanisms 16-18 are arranged to act along the directions 11,12. The replacement cassettes 6',9' will then be drawn into the operative positions normal, rather parallel, to the direction of travel of the photographic paper 5 through the printer 1 whereas the operative cassettes 6,9 will be pushed out of the operative positions parallel to this direction, i.e., counter to the directions 11, 12.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. An apparatus for processing photosensitive material, comprising a processing station for such material; a first station to one side of said processing station designed to accommodate a carriage-like cassette for photosensitive material, said first station including cassette guiding and locating means; means for conveying photosensitive material between said processing station and said first station; a second station next to said first station designed to accommodate a carriage-like cassette for photosensitive material preparatory to entry into said first station, said second station including cassette guiding and holding means; and means for moving a cassette from said second station to said first station along a first direction; and means for removing a cassette from said first station along a second direction transverse to said first direction.

2. The apparatus of claim 1, further comprising another station to another side of said processing station designed to accommodate a carriage-like cassette for photosensitive material, said other station including cassette guiding and locating means; an additional station next to said other station designed to accommodate a carriage-like cassette preparatory to entry into said other station, said additional station including cassette guiding and holding means; additional means for moving a cassette from said additional station to said other station along a preselected direction; and additional means for removing a cassette from said other station along another direction transverse to said preselected direction, said conveying means being designed to withdraw photosensitive material from a cassette at said first station, convey the material through said processing station and introduce the material into a cassette at said other station.

3. The apparatus of claim 2, wherein said conveying means is automatic.

4. The apparatus of claim 1, wherein said guiding and locating means includes at least one guide extending along a predetermined direction, said guiding and holding means being disposed next to said one guide as considered in said predetermined direction.

5. The apparatus of claim 4, wherein said predetermined direction is said first direction.

6. The apparatus of claim 1, wherein said moving means is designed to draw a cassette from said second station to said first station.

7. The apparatus of claim 1, wherein said removing means is designed to propel a cassette out of said first station.

8. The apparatus of claim 1, wherein said processing station comprises a printer.

9. The apparatus of claim 1, wherein said processing station comprised a developer.

10. The apparatus of claim 1, wherein the cassettes travel on wheels and said guiding and locating means is designed to position a cassette such that the wheels of the latter are at predetermined locations of said first station, said guiding and locating means including a first rail, and said guiding and holding means including a second rail constituting an extension of said first rail, said rails cooperating to define a gap in register with one of said predetermined locations.

11. The apparatus of claim 10, wherein each cassette has two pairs of spaced wheels designed to flank said rails, at least one of said rails having a sword-like or wedge-like configuration.

12. The apparatus of claim 1, wherein said guiding and holding means includes a wedge-like stop in the path of a cassette travelling along said first direction.

13. The apparatus of claim 1, wherein said moving means includes a member movable back-and-forth along said first direction and having a catch engageable with complementary catches on the cassettes.

14. The apparatus of claim 13, wherein said moving means includes a biasing element for said catch to urge the latter into engagement with a cassette.

15. The apparatus of claim 14, wherein said catch has a surface designed to slide along complementary surfaces of the cassettes preparatory to coupling of said member to the cassettes, said surface being downwardly inclined in a direction from said first station to said second station.

16. The apparatus of claim 13, wherein the catches on the cassettes are defined by grooves arranged to extend along said second direction when the cassettes are in said first station, said catch being slidably receivable by the grooves.

17. The apparatus of claim 1, wherein said removing means comprises a member movable back-and-forth along said second direction and having a plate-like element arranged to abut the side of a cassette.

18. The apparatus of claim 1, further comprising pneumatic means for driving said moving means and said removing means.

19. The apparatus of claim 1, further comprising means for driving said moving means and said removing means; detector means for sensing the presence and absence of photosensitive material in said processing station; and control means for said driving means responsive to said detector means.

20. The apparatus of claim 19, wherein said control means is electronic.

* * * * *